INVENTOR
WILHELMUS H. IDING

BY Frank R. _____
AGENT

Nov. 2, 1971  W. H. IDING  3,616,529
TRANSDUCER AND METHOD OF MAKING SAME
Filed Aug. 20, 1968  3 Sheets-Sheet 2

INVENTOR

WILHELMUS H. IDING

BY Frank R. Trifari
AGENT

Nov. 2, 1971  W. H. IDING  3,616,529

TRANSDUCER AND METHOD OF MAKING SAME

Filed Aug. 20, 1968  3 Sheets-Sheet 3

INVENTOR.
WILHELMUS H. IDING
BY
AGENT form # United States Patent Office 3,616,529
Patented Nov. 2, 1971

3,616,529
TRANSDUCER AND METHOD OF MAKING SAME
Wilhelmus Hermanus Iding, Emmasingel, Eindhoven, Netherlands, assignor to U.S. Philips Corporation, New York, N.Y.
Filed Aug. 20, 1968, Ser. No. 754,032
Claims priority, application Netherlands, Aug. 31, 1967, 6711958; July 13, 1968, 6809978
Int. Cl. H04r 31/00
U.S. Cl. 29—594
6 Claims

ABSTRACT OF THE DISCLOSURE

A method of manufacturing a transducer including pre-tinning the ends of a coil and of conductor leads, disposing the tinned ends adjacently within the cavity of a mold, injecting a thermosetting resin into the mold cavity and heating the resin to form a diaphragm therein, with the heat from the resin causing the adjacent tinned ends to become soldered, said ends also being embedded in the resin.

---

This invention relates to a method of joining the moving parts of a transducer, which parts comprise a coil and a diaphragm, the ends of the coil being soldered to thin strip-like conductors provided between coil and diaphragm. Such a method is known in which a diaphragm comprising a plurality of layers is provided with two radial metal strips which are arranged against the lower side of the diaphragm between the coil and the diaphragm. The ends of the metal strips are bent over, thus embracing part of the diaphragm.

Experiments have revealed that such fastening of the strips was not particularly satisfactory after longer use, since rupture phenomena occurred in the strips. These rupture phenomena resulted from the constantly varying forces transferred to the radially-arranged strip-like conductors by the vibrating diaphragm.

The present invention is characterized in that the coil and the strip-like conductors, which have already been tinned, are first placed in a mold with the conductors at the ends of the coil which have likewise been tinned. Then a thermo-setting synthetic resin is supplied into the mold to form the diaphragm, whereafter the said elements are joined in one operation by bonding pressure. The disadvantage above referred to is thus avoided. The strip-like conductors come to lie wholly embedded in the synthetic resin. Similar tests have revealed that such strip-like conductors are much more durable, even though the thickness of the covering layer is approximately a few tens of microns.

The heat supplied causes the thin solder on the ends of the coil and on the metal strips to flow, resulting in these parts being soldered together. At the same time, the hot synthetic resin flows, fills up the cavities in the mold and also covers the soldering areas just formed between the ends of the coil and the strip-like conductors.

The method according to the invention affords the further advantage that all the vibrating parts are formed into a unit in one operation, which may be effected on a single machine, so that the manufacturing cost of transducers when manufactured in bulk is reduced considerably.

Another advantage is that the coil is centered relative to the diaphragm in the mold itself. This is important, especially for horn loudspeakers, where the vibrating surface of the diaphragm extends within the coil in the form of a dome. The excessive synthetic resin which has flowed out at the edge of the diaphragm is cut off by an annular cutting die surrounding the mold.

A particular method according to the invention is characterized in that the synthetic resin is introduced into the mold in a pulverulent state while heating the mold. The heating process may take place by inductive means. As an alternative, the synthetic resin may be injected into the mold in preheated condition. Diaphragms of great thinness are materially strengthened by adding a strengthening agent, for example, pulverulent glass, to the thermosetting synthetic resin.

The above-mentioned methods permit of obtaining a transducer having a diaphragm of thermosetting synthetic resin and a self-supporting coil the ends of which are soldered to strip-like conductors between coil and diaphragm and in which the conductors and the ends of the coil are wholly embedded in the synthetic resin. The moving parts of the said transducer are united to form a rigid assembly having a substantially limitedless life.

For horn loudspeakers of high power it is desirable in forming the diaphragm to make the synthetic resin also flow along the coil, thus covering it with a very thin layer of synthetic resin. The connection between coil and diaphragm thus becomes stronger. It has been found that the manufacturing process may be even simplified by shaping the strip-like conductors into particular forms. It is very advantageous if the conductors extend from edge to edge over the diaphragm. In the manufacturing process the conductors are guided from rollers to the mold and, after formation of the diaphragm, severed by an annular cutting die simultaneously with the excessive synthetic resin that has flown away.

In one embodiment of the invention the conductor extends wholly over the spherical segment of the diaphragm formed by this conductor. If the material of the conductors consists of fine-meshed metalgauze, for example beryllium copper, the mechanical strength of the diaphragm is considerably increased thereby. In order that the invention may be readily carried into effect it will now be described in detail, by way of example, with reference to the accompanying diagrammatic drawings, in which.

Figure 1:
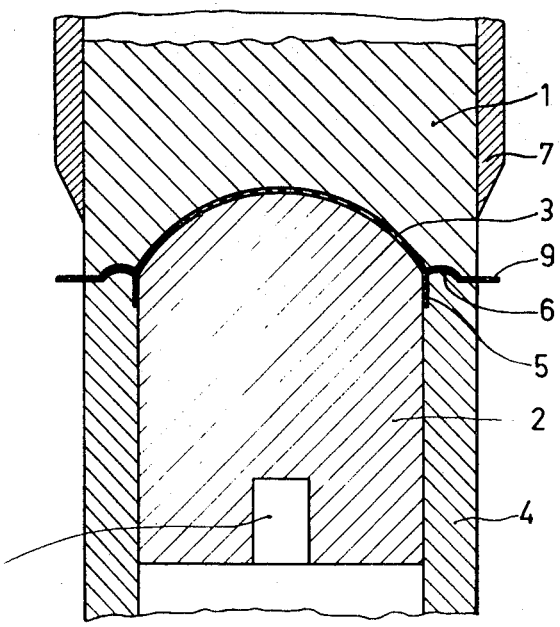
FIG. 1 is a cross-sectional view of a mold for forming a matrix according to the invention.
Figure 2:
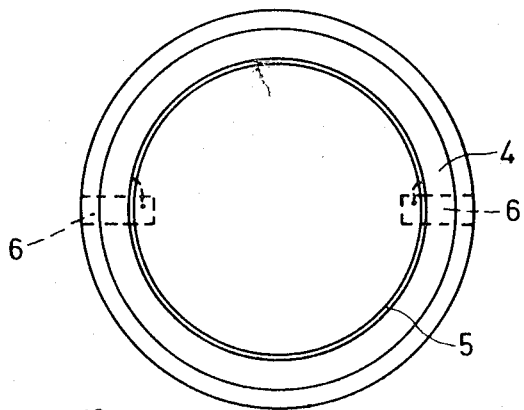
FIG. 2 is a plan view of the diaphragm.

The mold of FIG. 1 is built up of an upper die 1 and a lower die 2, which can move with respect to one another in the axial direction. The dies are separated by a cavity 3 for receiving an amount of thermosetting pulverulent synthetic resin, for example, epoxy resin. The lower die 2 is surrounded by an annulus 4 the upper side of which is provided with an internal annular recess 5 for receiving the coil. Furthermore the upper side of lower die 2 and annulus 4 has very shallow recesses 6 in which strip-like conductors 12 are disposed.

The upper die 1 is surrounded as a tight fit by an annular cutting die 7, which can slide in the axial direction along the annulus 4 likewise as a close fit. The lower die 2 is maintained at the required temperature by a heating element arranged in a cavity 8.

Figure 3:
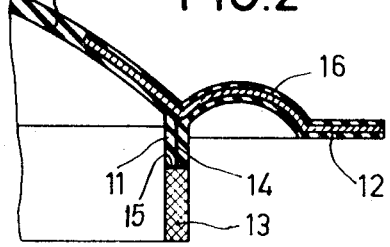
FIGS. 3, 4 and 5 show the product which has been manufactured by this method, that is to say a detail, a cross-section and a perspective view, respectively.
Figure 4:
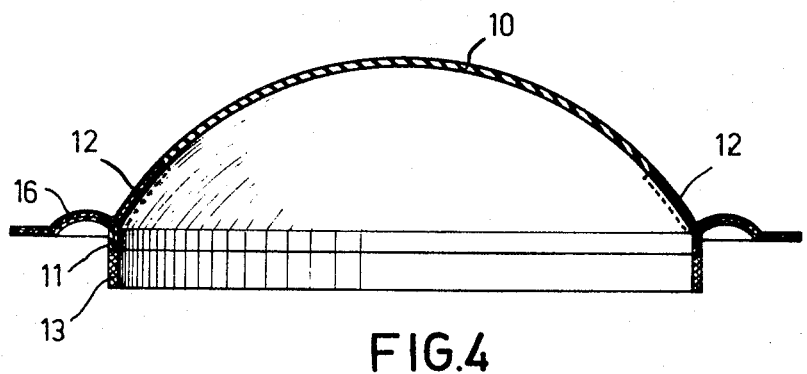
Figure 5:
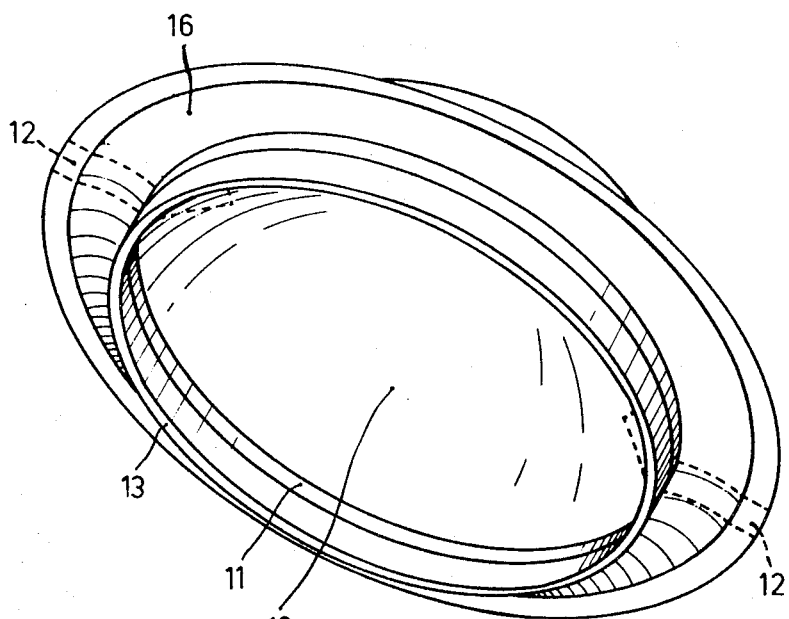

The manufacturing process proceeds as follows: A coil 13 (see FIG. 3), the ends 14 of which are tinned, is placed in the recess 5; then two strip-like conductors 12, likewise tinned, are placed in the cavities 6, whereafter the tinned ends 14 are laid over the conductors 12. A certain amount of thermosetting pulverulent synthetic resin is introduced into the cavity 3 and heated to approximately 150° C. The thin solder on the strip-like conductors 12 and on the ends 14 thus commences to flow and joins these parts. The pulverulent synthetic resin melts, flows out and fills the cavity 3. The upper die 1 is moved down until the desired thickness of diaphragm is obtained and presses out the excessive synthetic resin, that is to say a superfluous edge 9 occurs, which is severed by the cutting die 7.

The product thus obtained in one operation may be directly placed in a magnetic system annex housing of a horn loudspeaker, the edge of the diaphragm being centred on the magnetic system. This product, the diaphragm 10 of which may have been strengthened with a glass texture or glass powder and has a thickness between 60$\mu$ and 80$\mu$, is mechanically very strong. The copper strip-like conductors 13, each 50$\mu$ thick, are covered on either side by synthetic resin between 10$\mu$ and 20$\mu$ thick. The strips 13 thus embedded are integral with the diaphragm and can resist the great bending and torsion forces which occur especially in horn loudspeakers of high powers. As the synthetic resin flows out, the soldering areas are at the same time covered.

Figure 6:
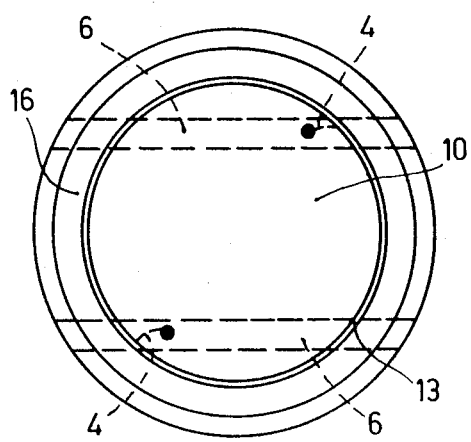
FIGS. 6 and 7 show a plan view in which the strip-like conductors are of different shapes.
Figure 7:
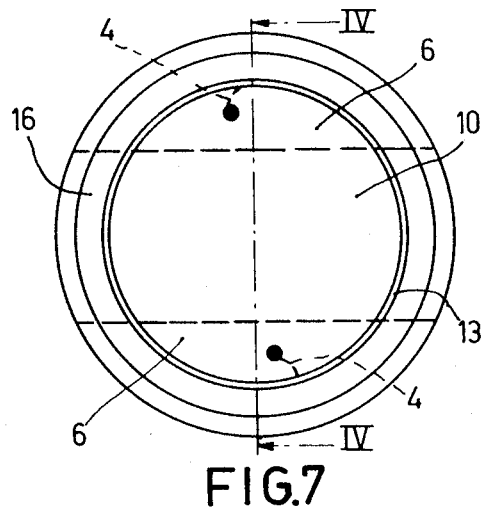

If use is made of a so-called self-supporting coil which is obtained from thermoplastic copper wire by pressure bonding, the resulting flat upper side 15, which forms a good surface of adhesion, is connected to diaphragm 10. In this case a bushing 11 is obtained which forms a rigid assembly with diaphragm 10 and edge 16. In FIGS. 6 and 7 the strip-like conductors 6 extend from edge to edge over part of the dome-shaped central portion 10 of the diaphragm. In FIG. 7 this conductor extends completely over the remaining segment-shaped portion of the diaphragm. The conductors are made of beryllium-copper gauze, thus making the diaphragm mechanically stronger.

What is claimed is:

1. A method of forming a diaphragm and coil transducer assembly with a mold assembly having a cavity for defining a diaphragm, comprising:
   (a) tinning the ends of a coil,
   (b) disposing the coil in a portion of said mold,
   (c) tinning the ends of conductor leads,
   (d) disposing the tinned ends of said leads and coil adjacently in the mold,
   (e) transferring a thermosetting synthetic resin into the mold cavity and about said adjacent ends and heating said resin, and
   (f) applying pressure to said resin within the cavity and thereby forming a diaphragm unified with said coil and conductor leads into said assembly, and also soldering together said adjacent tinned ends by the heat from said resin.

2. A method according to claim 1, with the resin in the mold in a pulverulent state, and comprising the step of heating the mold and thereby heating the resin therein.

3. A method according to claim 1 comprising the step of heating the resin before it is transferred into the cavity.

4. A method according to claim 1 comprising the further step of adding to the resin a strengthening agent such as pulverulent glass.

5. A method according to claim 1 wherein said application of pressure causes flowing of excess resin out of the cavity, comprising the further step of severing said excess resin from the mold and diaphragm.

6. A method according to claim 1 comprising the step of forming said resin within said cavity into layers on both sides of the conductors.

References Cited
UNITED STATES PATENTS

| | | | |
|---|---|---|---|
| 3,143,787 | 8/1964 | Bobbe | 174—68.5 X |
| 3,501,832 | 3/1970 | Iwata et al. | 29—626 |
| 1,969,256 | 8/1934 | Clark et al. | 29—594 X |
| 2,894,182 | 7/1959 | Zuerker et al. | 179—115.5 VC |
| 2,997,549 | 8/1961 | Hassan | 179—115.5 VC |
| 3,014,996 | 12/1961 | Swanson | 179—115.5 VC |
| 3,150,441 | 9/1964 | Kloss | 29—594 X |
| 3,351,719 | 11/1967 | Schoengold | 29—594 UX |
| 3,404,053 | 10/1968 | Tokuma et al. | 29—594 X |

FOREIGN PATENTS

| | | | |
|---|---|---|---|
| 637,013 | 6/1947 | Great Britain | 29—594 |

JOHN F. CAMPBELL, Primary Examiner

R. J. SHORE, Assistant Examiner

U.S. Cl. X.R.
179—115.5